United States Patent [19]

Bertram et al.

[11] Patent Number: 5,537,208
[45] Date of Patent: Jul. 16, 1996

[54] INTERFEROMETER SPECTROMETER HAVING MEANS FOR VARYING THE OPTICAL PATH LENGTH WHILE MAINTAINING ALIGNMENT

[75] Inventors: Albert R. J. Bertram; Johannes W. Coenders; Francis J. Span, all of Eindhoven, Netherlands

[73] Assignee: U.S. Philips Corporation, New York, N.Y.

[21] Appl. No.: 810,747

[22] Filed: Dec. 18, 1991

[30] Foreign Application Priority Data

Dec. 19, 1990 [GB] United Kingdom .................... 9027480

[51] Int. Cl.⁶ ........................................................ G01B 9/02
[52] U.S. Cl. ................................................. 356/346
[58] Field of Search ................................. 356/345, 346, 356/358, 356

[56] References Cited

U.S. PATENT DOCUMENTS

| | | |
|---|---|---|
| 4,681,445 | 7/1987 | Perkins ............................. 356/346 |
| 4,684,255 | 8/1987 | Ford .................................. 356/346 |
| 4,717,241 | 1/1988 | Aagano . |
| 4,726,657 | 2/1988 | Perkins et al. . |
| 4,915,502 | 4/1990 | Brierley ............................ 356/346 |
| 4,991,961 | 2/1991 | Strait ................................. 356/346 |

FOREIGN PATENT DOCUMENTS

| | | |
|---|---|---|
| 0171837 | 2/1986 | European Pat. Off. . |
| 1066949 | 4/1967 | United Kingdom . |

*Primary Examiner*—Samuel A. Turner
*Attorney, Agent, or Firm*—Paul Miller; William Bofjer

[57] ABSTRACT

An interferometer which may be used in a Fourier transform infra red spectrometer comprises a beam splitter (10), first and second fixed mirrors (18,26), path length variation means (20), and a folding mirror (16). The optical components are mounted on a casting (8) such that the beam splitter (10) and folding mirror (16) are arranged parallel to each other and the fixed mirrors (18,26) are attached to a single face of the casting in the same plane. The path length variation means (20) comprises two parallel opposed mirrors (22,24) which are rotatable to vary the length of the optical path between the beam splitter (10) and the fixed mirror (26).

8 Claims, 6 Drawing Sheets

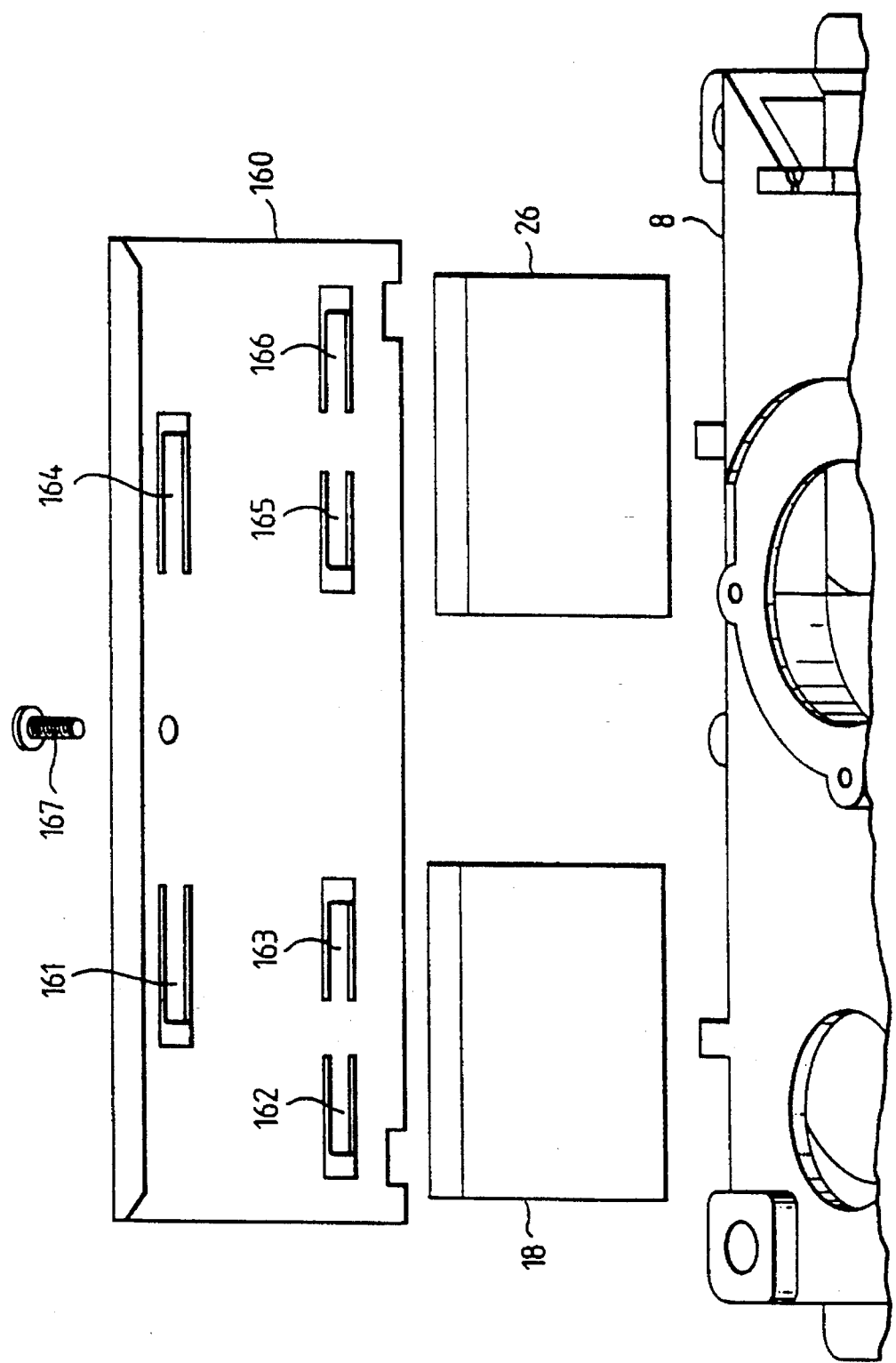

5,537,208

INTERFEROMETER SPECTROMETER HAVING MEANS FOR VARYING THE OPTICAL PATH LENGTH WHILE MAINTAINING ALIGNMENT

BACKGROUND OF THE INVENTION

The invention relates to an interferometer comprising a beam splitter for splitting an incident radiation beam into two sub-beams following first and second separate paths, first and second fixed mirrors terminating the first and second paths and serving to reflect the sub-beams back to the beam splitter, the beams splitter being further arranged to re-combine the sub-beams, at least one of the first and second paths including path length variation means.

Such a system is known from EP 171 837 in which a beam splitter, two fixed mirrors and a rotatable mirror set define the basic structure of the interferometer. In this interferometer a variation in optical path length can be realised relatively simply and the construction of the optical arrangement is relatively straightforward.

A disadvantage of this solution is that the optical elements listed need to be mounted in accurately defined positions relative to each other and these positions are relatively widely spaced and in different orientations.

It is an object of the present invention to mitigate this disadvantage.

SUMMARY OF THE INVENTION

The invention provides an interferometer according to the opening paragraph characterised in that a third fixed mirror is arranged parallel to the beam splitter in the first path to direct radiation onto the first mirror, the first mirror being arranged to lie in the same plane as or in a plane parallel to that containing the second mirror.

It is noted that such an interferometer may be designed for operation in any of the ultra-violet, the visible light and the infra-red regions of the electromagnetic wavelength spectrum.

The path length variation means may comprise two parallel opposed mirrors mounted on a body and means for rotating the body about an axis which may pass between the mirrors.

This construction of path length variation means enables the construction of an interferometer which has three separate sets of optical assemblies such that within each set the optical elements are arranged parallel to each other. This simplifies the optical arrangement of the interferometer and eases the problems of alignment since ensuring that objects are parallel is usually easier than accurately positioning them relative to each other in other orientations.

The interferometer may comprise a casting having mounting points on which the first, second, and third mirrors, the beam splitter, and the path length variation means are located.

This provides a stable construction and by correct selection of the mounting points can simplify the construction of the interferometer.

The first and second fixed mirrors may be mounted on a single machined face of the casting.

This enables the first and second fixed mirrors to be mounted accurately co-planar with each other as it is easier to machine a flat surface in a single plane to a given tolerance than to ensure that separately machined surfaces have the same degree of parallelism.

Means may be provided for adjusting the position of a mounted optical component, said means comprising a hole having a decreasing cross-section formed close to the surface against which the component is mounted and a screw for insertion into the hole.

This enables the adjustment of the position of an optical element by very small amounts, for example of the order of nanometres, enabling a very precise positioning of an element to be achieved.

Mirror mounting means may be provided comprising at least one finger urged against the mirror at a position adjacent to its fixed end and screw means adjacent to the free end of the finger serving to adjustably deflect the finger.

This gives a relatively small movement of the mirror position for a relatively large movement of the screw enabling a precise positioning of the mirror to be achieved. That is movement of the free end of the finger is larger, by the beam deflection ratio, than the movement at the position where it is urged against the mirror.

The invention further provides a Fourier transform spectrometer including an interferometer as set forth in the preceding paragraphs.

BRIEF DESCRIPTION OF THE DRAWINGS

The above and other features and advantages of the invention will become apparent from the following description of exemplary embodiments with reference to the accompanying drawings, in which:

FIG. 4 is an exploded perspective view of a mounting arrangement for mounting the first and second fixed mirrors in the interferometer of FIG. 1.

DETAILED DESCRIPTION OF THE PREFERRED EMBODIMENTS

Figure 1:
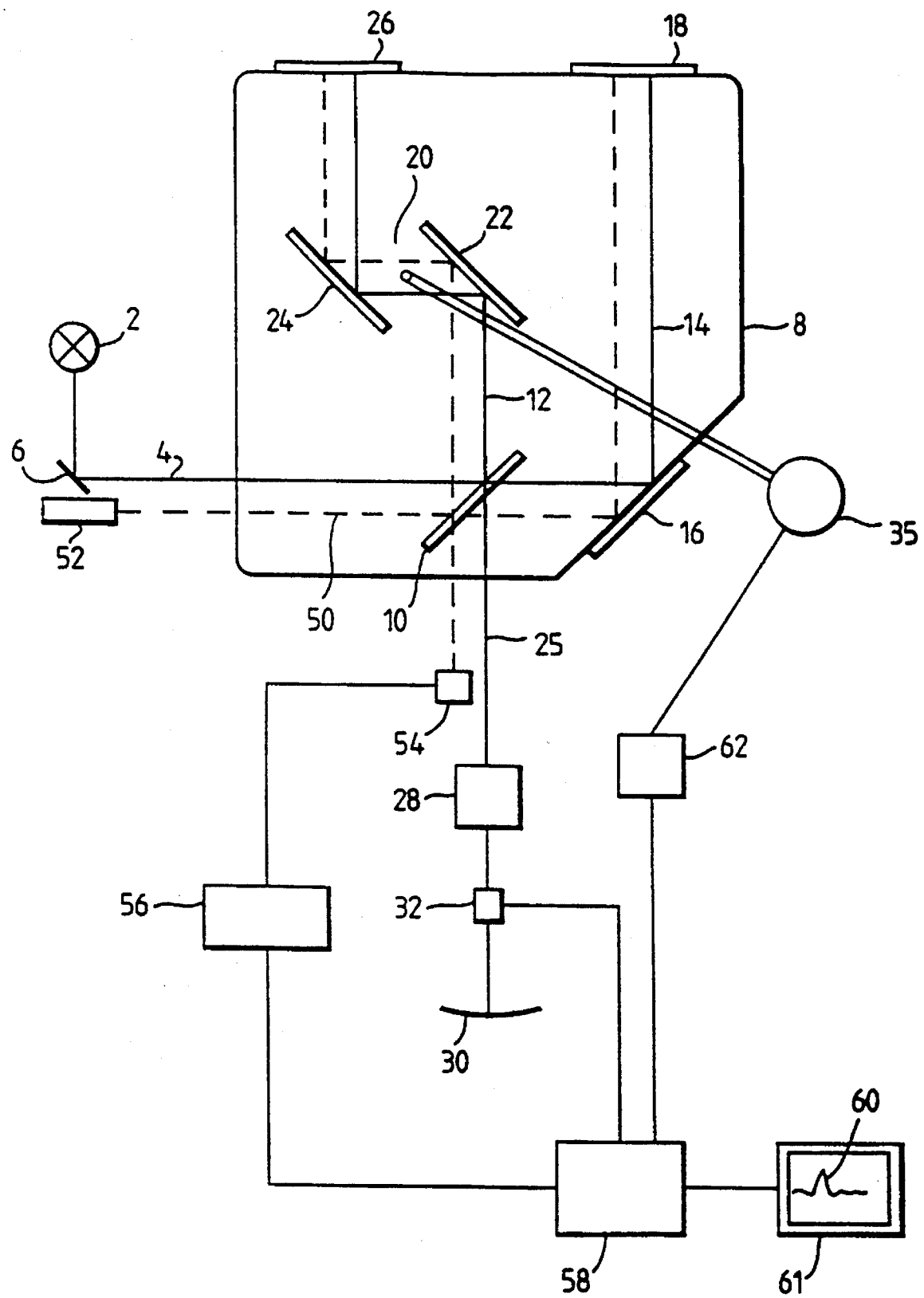
FIG. 1 shows in schematic form a Fourier transform spectrometer and an interferometer according to the invention.

The apparatus shown in FIG. 1 comprises a radiation source 2, for example a broad-band infrared radiation source, for producing a beam 4 of infrared radiation which is collimated by a concave mirror 6. Inside a casting 8 the beam 4 is split by a beam splitter 10 into a first sub-beam 12 and a second sub-beam 14.

The sub-beam 14 is folded through 90 degrees by a mirror 16 and reflected by a first fixed mirror 18 to be returned back to the beam splitter 10 via the folding mirror 16. The sub-bean 12 is reflected through a rotatable parallel mirror system 20 comprising a first mirror 22 and a second mirror 24, reflected by a second fixed mirror 26 through the parallel mirror system and back to the beam splitter 10. The length of the beam path for subbeam 12 can be changed by rotating the parallel mirror system 20. Subbeams 12 and 14 are combined at the beam splitter 10 to form a combined output beam 25. The combined beam is directed through a sample 28 whose absorption spectrum is to be measured. The combined beam 25 after passing through the sample 28 is focussed by a concave mirror 30 onto a detector 32.

The parallel mirror system is rotatable by means of a motor drive as disclosed in EP 171 837 or by a motor 35 directly coupled to the mirror system resulting in a more accurate movement control. A reference beam 50 of for example visible radiation from a helium-neon laser 52 is also directed through the optical paths of the interferometer, interference fringes being formed on a separate detector 54. The output of this detector is fed to a waveform shaping circuit 56 to generate sampling instant signals which occur at intervals of one wavelength of the laser source or fractions or multiples thereof as the optical path length is changed. These sampling signals control the instants at which the output of detector 32 is sampled to provide inputs to a computer 58 which calculates a spectrum 60 of beam 25 using, for example, a program based on the known Cooley Tukey algorithm. The spectrum is then displayed on a monitor 61. In addition the drive motor 35 is controlled in speed by control circuit 62 in response to the sampling instant signals to keep the rate of sampling constant.

In use the optical path lengths of the two subbeams may be initially equalised with the rotating mirrors system 20 at one end of its working range of path length variation. The zero order fringe is then incident on the detector. The mirrors are then rotated to produce the change in optical path length necessary to realise the desired wavenumber resolution. A so-called single sided interferogram is then obtained. More desirably, the path lengths are equalised with the rotating mirror system in the middle of its working range, the mirrors then being driven through the whole working range to produce a double sided interferogram which in use can be more easily made less susceptible to phase errors.

Figure 2:
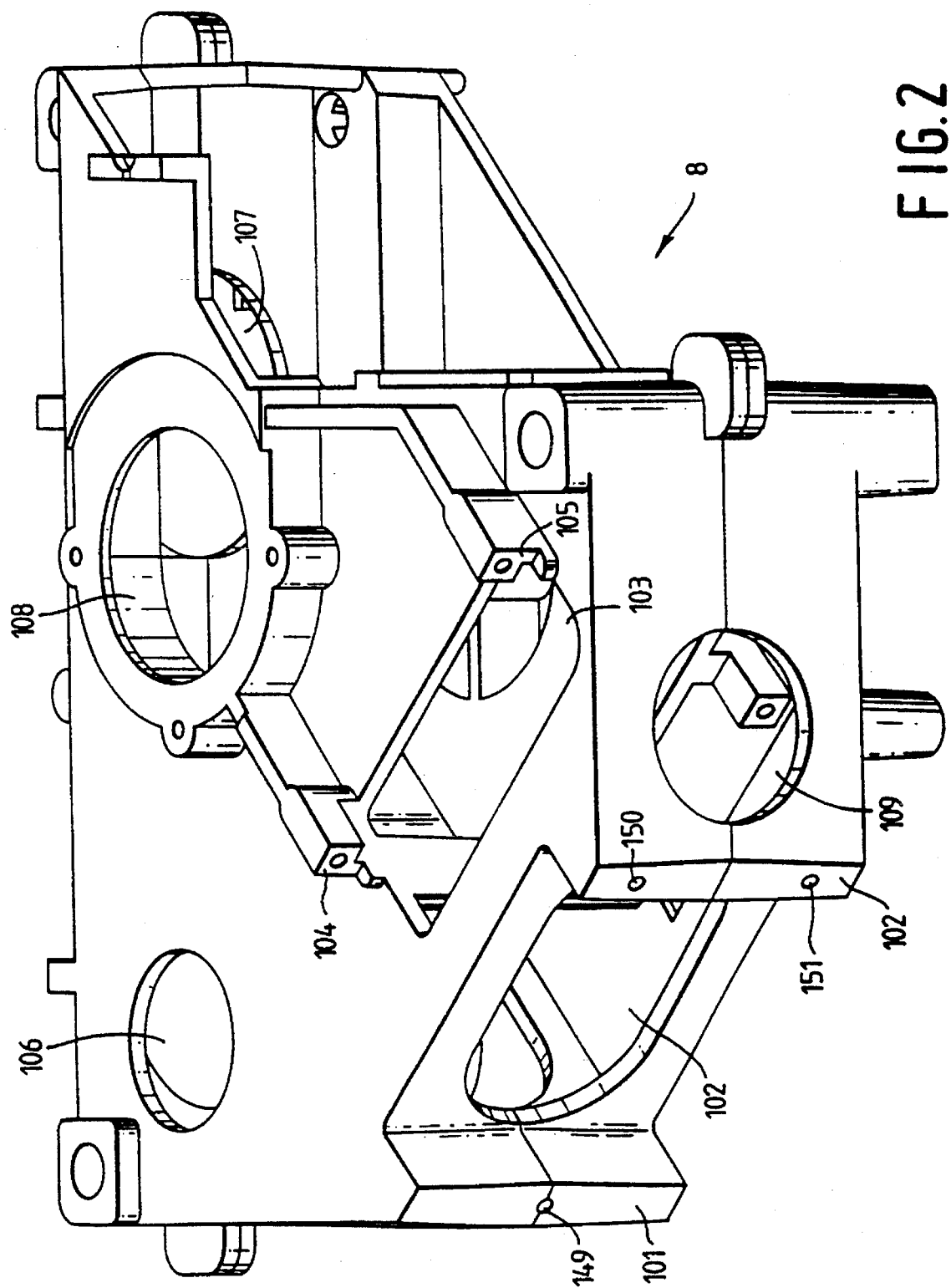
FIG. 2 shows a perspective view of a casting for use in the interferometer of FIG. 1.

FIG. 2 is a perspective drawing of a casting on which the fixed mirrors 16, 18 and 26, the beam splitter 10, and the rotating mirror set 20 are mounted.

The folding mirror 16 is mounted against two faces 100 and 101 on either side of an aperture 102 through which the radiation beam reaches the mirror 16. The beam splitter 10 is mounted within the casting 8 through an aperture 103 against three faces 104, 105 and 120. The first fixed mirror 18 is mounted against a rear face of the casting 8 over an aperture 106 through which it receives the radiation subbeam 14. Similarly the second fixed mirror 26 is also mounted against the rear face of the casting 8 over an aperture 107 through which it receives the radiation subbeam 12. The rotating mirror set 20 is mounted within the casting 8 between a bearing formed on the lower side of the casting 8 and a plate carrying the motor 35 which is coupled to the casting 8 around an aperture 108. The casting 8 is open at the right hand side to allow radiation beam 4 from the radiation source 2 to be directed onto the beam splitter 10 and has an aperture 109 to allow the re-combined beam 25 to be directed through the sample onto the detector 32.

Figure 3:
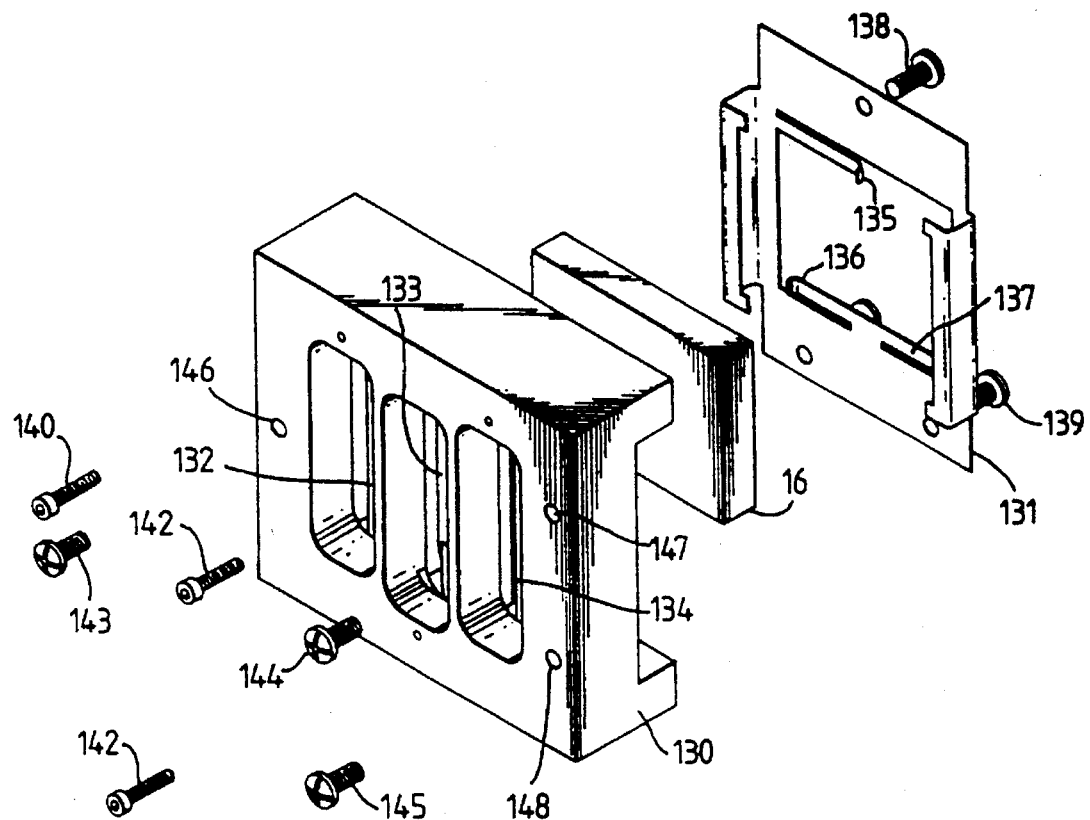
FIG. 3 is an exploded perspective view of a folding mirror assembly for use in the interferometer of FIG. 1.

FIG. 3 is an exploded perspective view of the folding mirror 16 and its mount. The mirror mount comprises a body 130 and spring member 131. The body 130 has three fingers 132, 133, 134 against which the mirror 16 is urged by the spring member 131. The spring member 131 has three leaf springs 135, 136, 137 which contact the mirror 16 when the spring member 131 is assembled to the body 130 using three screws, two of which 138 and 139 are shown. Three adjusting screws 140, 141,142 bear on the fingers 132, 133, 134 near to their free ends to provide a fine adjustment of the mirror position. Pads on the fingers 132, 153, 134 near to their fixed ends bear on the mirror so that a relatively large movement of the screws 140, 141,142 produce a pelatively small movement of the mirror position. The body 130 is attached to the casting 8 by means of three screws 143, 144, 145 which pass through holes 146, 147, 148 in the body 130 and into corresponding holes 149, 150, 151 in the casting 8.

FIG. 4 is an exploded view of the mounting means for the first and second fixed mirrors 18 and 26. The mirrors are each mounted against three machined pads on the rear surface of the casting 8 by means of a single spring member 160. The spring member 160 has a first set of leafsprings 161,162, 163 which bear on mirror 18 and a second set of leafsprings 164, 165, 166 which bear on mirror 26. The spring member 160 is attached to the rear of the casting 8 by a screw 167 and two integral hooks.

Figure 5:
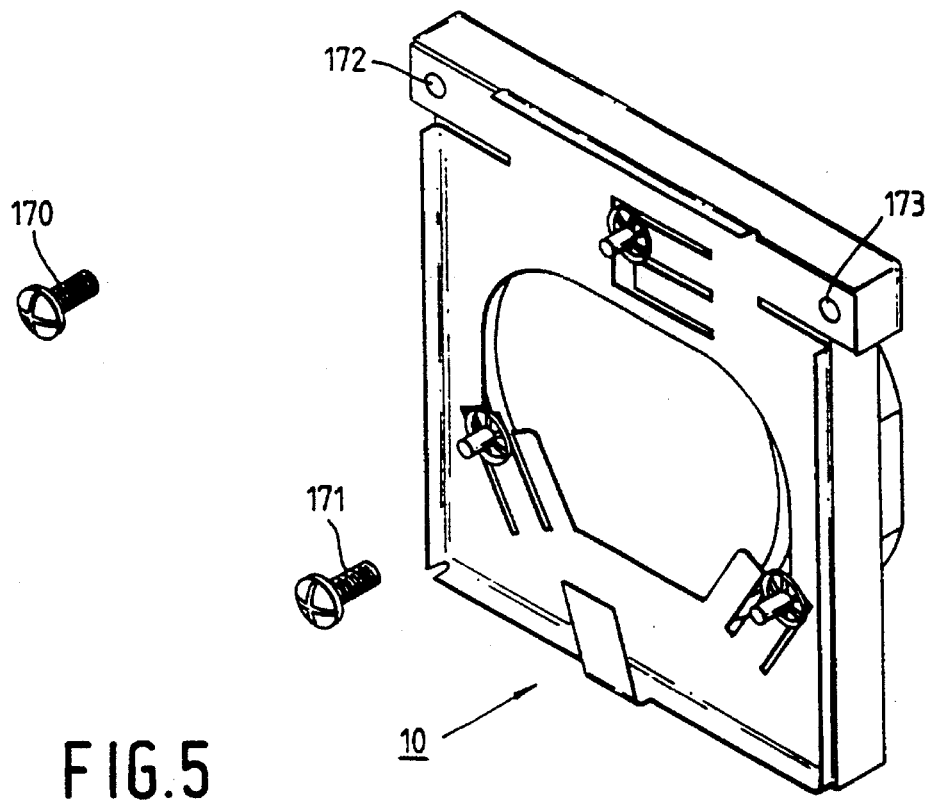
FIG. 5 is a perspective view of a beam splitter for use in the interferometer of FIG. 1
Figure 6:
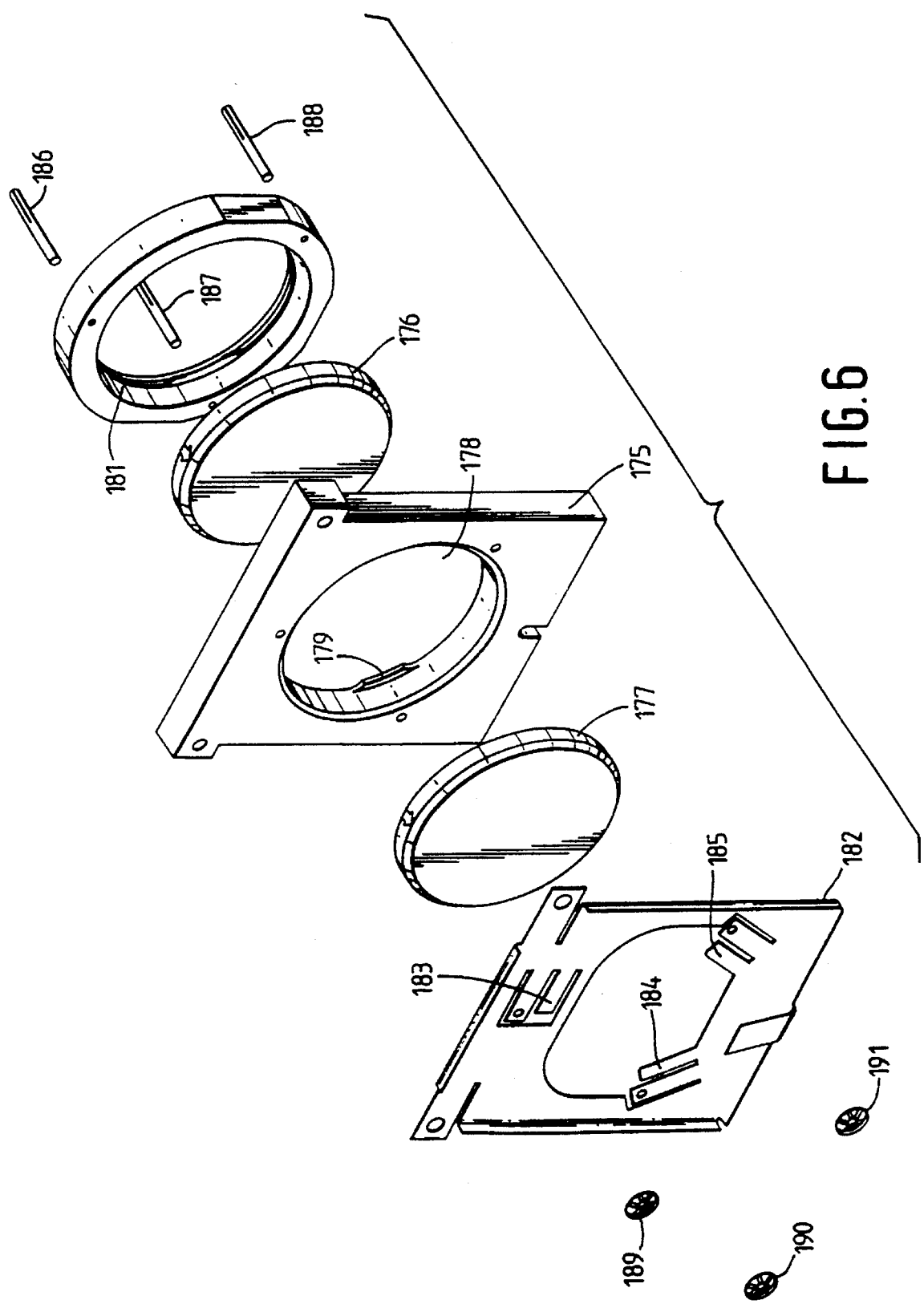
FIG. 6 is an exploded perspective view of the beam splitter shown in FIG. 5.

FIG. 5 is a perspective view of the beam splitter 10 which is mounted against the faces 104, 105 of the casting by means of screws 170, 171 which pass through holes 172, 173 in the beam splitter 10 and against fence 120 by spring tab 194. FIG. 6 is an exploded perspective view of the beam splitter 10 which comprises a body 175 on which a beam splitter plate 176 and a compensator plate 177 are mounted. The body 175 has an aperture 178 in which three locating lugs, one of which 179 is shown, are arranged at 120 degree intervals. The beam splitter plate 176 is mounted on one side of the body 175 by means of a collar 180 inside which resilient means 181 urge the beam splitter plate 176 against the lugs 179. The compensator plate 177 is mounted on the other side of the body 175 by means of a spring member 182 which contains three leafsprings 183, 184, 185 which bear against the compensator plate 177 to urge it against the lugs 179. The assembly is held together by three pins 186, 187, 188 and corresponding self locking rings 189, 190, 191.

Figure 7:
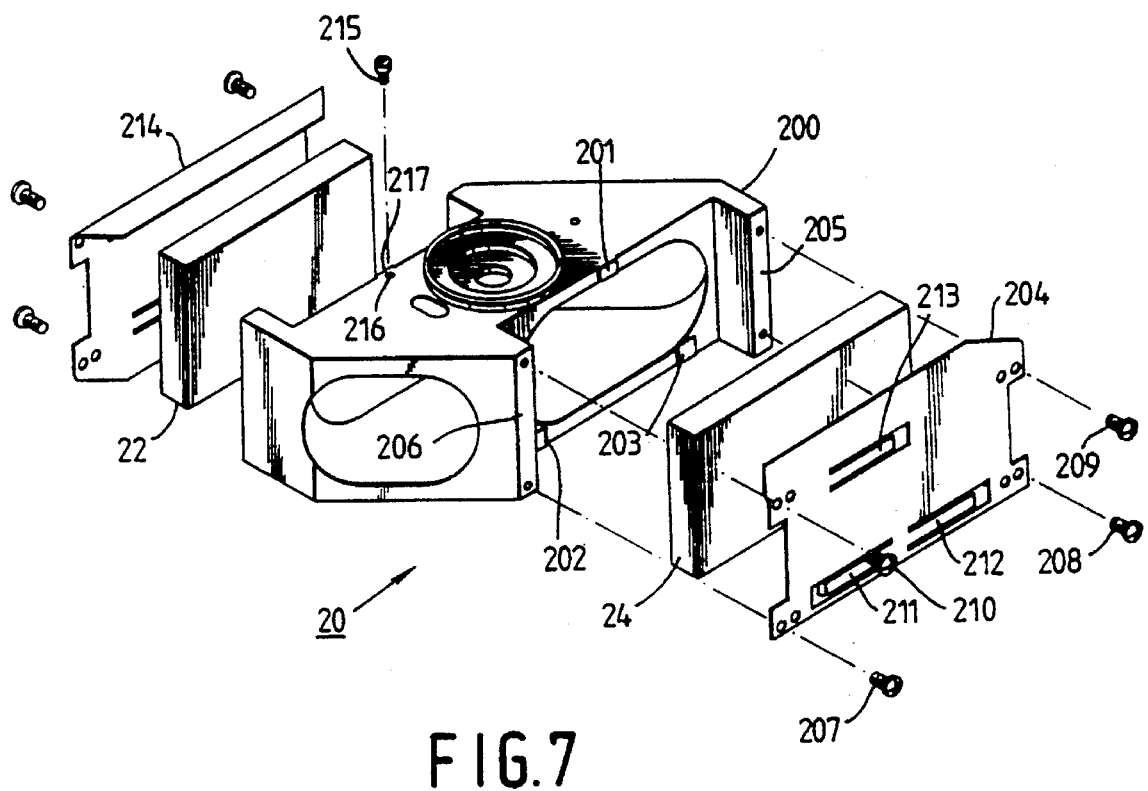
FIG. 7 is an exploded perspective view of path length variation means for use in the interferometer of FIG. 1.
Figure 8A:
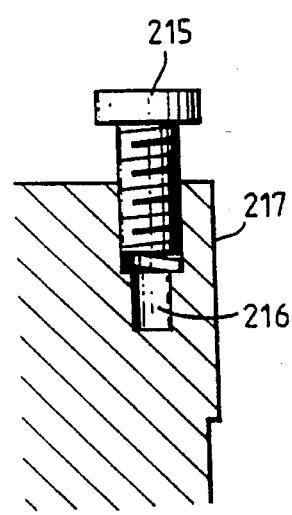
FIG. 8 illustrates optical element adjusting means according to the invention.
Figure 8B:
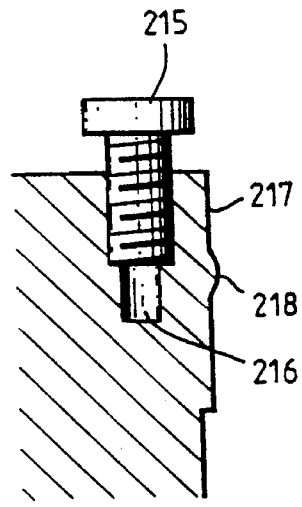

FIG. 7 shows an exploded perspective view of the rotatable mirror assembly 20. It comprises a body 200 on which two mirrors 22, 24 are mounted. The mirror 24 is mounted against three machined pads 201,202, 203 by means of a spring member 204 which is attached to faces 205 and 206 of the body 20 by means of four screws 207, 208, 209, 210. The spring member 204 comprises three leaf springs 211, 212, 213 which bear against the outer surface of the mirror 24 to urge it against the pads 201,202, 203. The mirror 22 is similarly mounted against the other side of the body 200 by means of a spring member 214. An adjuster screw 215 is inserted in a part threaded hole 216 in the body 200. The hole 216 is located close to a machined pad 217 which corresponds to the pad 201. As shown in FIG. 8a the screw 215 is inserted to the depth of the threaded portion of the hole 216. In FIG. 8b the screw 215 has been forced into the unthreaded portion of the hole and as a result a bulge 218 appears in the surface of the pad 217 which enables very small adjustment of the mirror position to be made. It is preferable if this method of adjustment is used to machine the body 200 from solid metal wrought material rather than forming it from a casting. This is because a casting tends to have a more porous structure and it is possible in some instances for the screw to break through the surface rather than to cause the bulge to appear. Of course, any other suitable adjustment means could be provided to accurately position the mirrors.

FIGS. 2 to 8 described a particular embodiment of the interferometer shown schematically in FIG. 1. Clearly the various optical components could by mounted on the casting 8 in alternative ways. Also it is not essential that the components are mounted on a cast base, for example it could be machined from solid either in one piece or a number of pieces joined together.

The path length variation means could be other than that described and may be included in both paths if desired. The path length variation means shown in FIGS. 1 and 7 could be modified by making it rotatable about an axis which lies outside the mirrors. The mirror position adjustment means described with reference to FIG. 8 could be modified by making it a tapering hole. All that is required in principle is that the cross section of the hole becomes smaller at some point either continuously or abruptly so that forcing in the screw causes the bulge to appear. This mirror adjustment means could be incorporated in the mounting means of any of the mirrors or the beam splitter either as the sole adjustment means or in addition to the adjustment means already provided.

From reading the present disclosure, other modifications will be apparent to persons skilled in the art. Such modifications may involve other features which are already known in the design, manufacture and use of spectrometers and interferometers for use in such spectrometers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. An interferometer comprising a beam splitter for splitting an incident radiation beam into two sub-beams following first and second separate paths, first and second fixed mirrors terminating the first and second paths and serving to reflect the sub-beam back to the beam splitter, the beam splitter being further arranged to re-combine the sub-beams, at least one of the first and second paths including path length variation means; characterized in that a third fixed mirror is arranged parallel to the beam splitter in the first path to direct radiation onto the first mirror, the first mirror being arranged to lie in a plane parallel to that containing the second mirror, wherein the first mirror lies in the same plane as that of the second mirror.

2. An interferometer as claimed in claim 1 in which the path length variation means comprises two parallel opposed mirrors mounted on a body and means for rotating the body.

3. An interferometer as claimed in claim 2 in which the body is rotated about an axis passing between the mirrors.

4. An interferometer as claimed in claim 1, comprising a casting having mounting points on which the first, second, and third mirrors, the beam splitter, and the path length variation means are located.

5. An interferometer as claimed in claim 4 in which the first and second mirrors are mounted on a single machined face of the casting.

6. An interferometer comprise a beam splitter for splitting an incident radiation beam into two sub-beams following first and second separate paths, first and second fixed mirrors terminating the first and second paths and serving to reflect the sub-beam back to the beam splitter, the beam splitter being further arranged to re-combine the sub-beams, at least one of the first and second paths including path length variation means; characterized in that a third fixed mirror is arranged parallel to the beam splitter in the first path to direct radiation onto the first mirror, the first mirror being arranged to lie in a plane parallel to that containing the second mirror, further comprising mirror mounting means comprising at least one finger urged against the mirror at a position adjacent to its fixed end and screw means adjacent to the free end of the finger serving to adjustably deflect the finger.

7. A Fourier transform spectrometer including an interferometer as claimed in claim 1.

8. An interferometer as claimed in claim 1 comprising means for mounting an optical component against a surface of a body, the mounting means comprising a hole whose depth extends parallel to the surface and which has a cross-section which decreases from its open to its closed end and a screw for insertion in the hole, when the screw is inserted in the hole the surface is caused to bulge around the hole and alter the orientation of an optical component mounted against the surface.

\* \* \* \* \*